US012056350B2

(12) United States Patent
Yang

(10) Patent No.: US 12,056,350 B2
(45) Date of Patent: Aug. 6, 2024

(54) PORTABLE ELECTRONIC DEVICE AND ONE-HAND TOUCH OPERATION METHOD THEREOF

(71) Applicant: ASUSTeK COMPUTER INC., Taipei (TW)

(72) Inventor: Chih-Hsien Yang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 29 days.

(21) Appl. No.: 17/691,142

(22) Filed: Mar. 10, 2022

(65) Prior Publication Data

US 2022/0291831 A1 Sep. 15, 2022

(30) Foreign Application Priority Data

Mar. 15, 2021 (TW) .................................. 110109104

(51) Int. Cl.
*G06F 3/04886* (2022.01)
*G06F 3/04845* (2022.01)

(52) U.S. Cl.
CPC ...... *G06F 3/04886* (2013.01); *G06F 3/04845* (2013.01)

(58) Field of Classification Search
None
See application file for complete search history.

(56) References Cited

U.S. PATENT DOCUMENTS

| 5,276,679 A * | 1/1994 | McKay ................. H04J 3/1647 370/542 |
| 2014/0181739 A1 * | 6/2014 | Yoo ...................... G06F 3/0488 715/800 |
| 2014/0267057 A1 * | 9/2014 | Zhao .................... G06F 1/1694 345/169 |
| 2014/0351761 A1 * | 11/2014 | Bae ..................... G06F 3/04817 715/835 |
| 2015/0012856 A1 * | 1/2015 | Xia ..................... G06F 3/04817 715/765 |
| 2016/0216869 A1 * | 7/2016 | Yan ..................... G06F 3/04845 |
| 2016/0349985 A1 * | 12/2016 | Ibaraki ................ G06F 3/04883 |

(Continued)

FOREIGN PATENT DOCUMENTS

| CN | 107493389 | 12/2017 |
| CN | 110007816 | 7/2019 |
| TW | I494846 | 8/2015 |

OTHER PUBLICATIONS

Jason Communication, "[Phone Expertise] Half of the iPhone screen left? Teach you how to turn off the "one-handed mode" function", with English translation thereof, Mar. 5, 2021, pp. 1-9. Available at: https://www.jyes.com.tw/news.php?act=view&id=1225.

*Primary Examiner* — Mandrita Brahmachari
(74) *Attorney, Agent, or Firm* — JCIPRNET

(57) ABSTRACT

A portable electronic device and a one-hand touch operation method thereof are disclosed. A touch operation performed on a touch screen is detected through the touch screen. A touch operation for triggering a one-hand operation mode on the touch screen is detected. A one-hand mode interface display region is defined on the touch screen according to a touch start point position of the touch operation. An operation interface screen that is scaled down or shifted is displayed within the one-hand mode interface display region.

9 Claims, 10 Drawing Sheets

(56) References Cited

U.S. PATENT DOCUMENTS

| | | | |
|---|---|---|---|
| 2018/0046366 A1* | 2/2018 | Li | G06F 3/0488 |
| 2018/0299970 A1* | 10/2018 | Kam | G06F 3/0484 |
| 2022/0357818 A1* | 11/2022 | Xiong | H04M 1/72403 |
| 2023/0009389 A1* | 1/2023 | Tan | G06F 3/0481 |

* cited by examiner

PORTABLE ELECTRONIC DEVICE AND ONE-HAND TOUCH OPERATION METHOD THEREOF

CROSS-REFERENCE TO RELATED APPLICATION

This application claims the priority benefit of Taiwan application serial No. 110109104, filed on Mar. 15, 2021. The entirety of the above-mentioned patent application is hereby incorporated by reference herein and made a part of the specification.

BACKGROUND OF THE INVENTION

Field of the Invention

The disclosure relates to a portable electronic device and a one-hand touch operation method thereof.

Description of the Related Art

Nowadays, portable electronic devices are gradually developing and tend to be equipped with large-size touch screens. However, a large-size touch screen prevents a user from touching some regions of the touch screen when the user operates the touch screen with one hand, causing difficulty and inconvenience in operation.

BRIEF SUMMARY OF THE INVENTION

The disclosure provides a portable electronic device, including a touch screen, a storage device, and a processor. The touch screen displays an operation interface screen. The storage device records a plurality of instructions. The processor is coupled to the touch screen and the storage device. The processor is configured to execute the instructions to perform the following steps: detecting a touch operation for triggering a one-hand operation mode on the touch screen; defining a one-hand mode interface display region on the touch screen according to a touch start point position of the touch operation; and displaying an operation interface screen that is scaled down or shifted within the one-hand mode interface display region.

According to an aspect of the disclosure, a one-hand touch operation method is provided. The one-hand touch operation method is applied to a portable electronic device including a touch screen. The method includes the following steps: detecting a touch operation for triggering a one-hand operation mode on the touch screen; defining a one-hand mode interface display region on the touch screen according to a touch start point position of the touch operation; and displaying an operation interface screen that is scaled down or shifted within the one-hand mode interface display region.

Based on the above descriptions, when a touch operation on the portable electronic device matches a trigger gesture, the portable electronic device of the disclosure activates a one-hand mode, so that an operation interface screen that is shifted or scaled down is displayed within the one-hand mode interface display region. The one-hand mode interface display region is dynamically defined according to the touch start point position of the touch operation for triggering a one-hand operation mode. In this way, the portable electronic device according to an embodiment of the disclosure is capable of shifting an operation interface screen to an appropriate position in response to different gestures of holding the portable electronic device by a user or different lengths of fingers of different users. Therefore, the convenience and flexibility of using the one-hand operation mode by a user are enhanced.

To make the features and advantages of the disclosure clear and easy to understand, the following gives a detailed description of embodiments with reference to accompanying drawings.

DETAILED DESCRIPTION OF THE EMBODIMENTS

Figure 1:
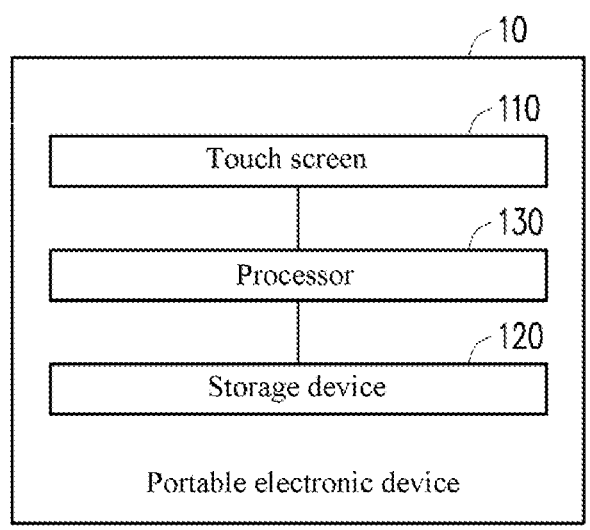
FIG. 1 is a functional block diagram of a portable electronic device according to an embodiment of the disclosure.

Some embodiments of the disclosure will be described in detail below with reference to the accompanying drawings. For reference numerals used in the following descriptions, same reference numerals in different accompanying drawings represent same or similar components. These embodiments are merely a part of the disclosure, and do not disclose all possible embodiments of the disclosure. More precisely, these embodiments are only examples of devices and methods in the scope of patent application of the disclosure.

FIG. 1 is a functional block diagram of a portable electronic device according to an embodiment of the disclosure. Referring to FIG. 1, a portable electronic device 10 is a smart phone, a personal digital assistant (PDA), a tablet computer, an e-book, a game console, or the like. This is not limited in the disclosure. The portable electronic device 10 includes a touch screen 110, a storage device 120, and a processor 130. The processor 130 is coupled to the touch screen 110 and the storage device 120. The functions of the processor are described below.

The touch screen 110 is a display device that integrates a touch sensing element, and provides both a display function and an input function. In an embodiment, the display device is a liquid crystal display (LCD), a light-emitting diode (LED) display, a field emission display (FED), an organic light-emitting diode display (OLED) or other types of displays, and the disclosure is not limited thereto. The touch sensing element is disposed on the display device, and the touch sensing element is configured to sense a touch operation performed on the display device. The touch operation includes touching the touch screen 110 with a finger, a palm, a body part or another object. In an embodiment, the touch sensing element is a capacitive touch sensor, a surface acoustic wave touch sensor, an electromagnetic touch sensor, or the like. The disclosure is not limited thereto.

The storage device 120 is configured to store files, images, instructions, codes, software elements, and other data, and is, in an embodiment, any type of fixed or removable random access memory (RAM), read-only memory (ROM), flash memory, and hard disk or other similar devices, integrated circuits, or a combinations thereof.

The processor 130 is coupled to the touch screen 110 and the storage device 120, is configured to control actions between members of the portable electronic device 10, and is, in an embodiment, a central processing unit (CPU), or other programmable general-purpose or special-purpose microprocessors, a digital signal processor (DSP), a programmable controller, an application-specific integrated circuit (ASIC), a programmable logic device (PLD), a graphics processing unit (GPU), or other similar devices or a combination of the devices. The processor 130 executes program code, a software module, instructions, and the like recorded in the storage device 120, so that a one-hand touch operation method according to an embodiment of the disclosure is realized.

In an embodiment, the portable electronic device 10 provides a function of a one-hand operation mode to adjust a display region of an operation interface screen on the touch screen 110, to allow a user to reach any position in the operation interface screen as much as possible. In an embodiment, before the one-hand operation mode is activated, the portable electronic device 10 displays the operation interface screen through the full display region of the touch screen 110. When the one-hand operation mode is activated, the portable electronic device 10 operating in the one-hand operation mode displays the operation interface screen in a one-hand mode interface display region, and an area of the one-hand mode interface display region is smaller than that of the full display region of the touch screen 110. The one-hand mode interface display region is located on at least one edge of the touch screen 110, to allow a finger to be placed on the edge to touch the operation interface screen within the one-hand mode interface display region.

In other words, the one-hand mode interface display region is a partial display region of the full display region of the touch screen 110. In an embodiment, the portable electronic device 10 operating in the one-hand operation mode shifts the operation interface screen in a specific direction, to display partial content of the operation interface screen through the partial display region of the touch screen 110. In an embodiment, the portable electronic device 10 operating in the one-hand operation mode scales down the operation interface screen, to display a part of the operation interface screen or the full operation interface screen through the partial display region of the touch screen 110.

In an embodiment, the touch screen 110 displays an operation interface screen. The operation interface screen includes an application program screen, an application program menu screen, a desktop screen, and a control menu screen, but is not limited thereto. The way of holding the portable electronic device 10 by a user with one hand is variable, and different users have fingers of different lengths. Therefore, in the disclosure, the one-hand mode interface display region used for displaying the operation interface screen in the one-hand operation mode is defined according to a touch start point position of the touch operation, so as to avoid as much as possible a situation that the user fails to smoothly operate the portable electronic device when the user holds the portable electronic device 10 with one hand. The embodiments are set forth below for detailed description.

Figure 2:
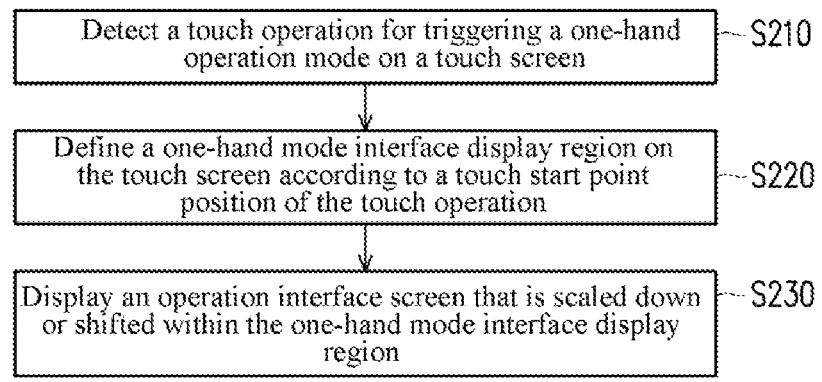
FIG. 2 is a flowchart of a one-hand touch operation method according to an embodiment of the disclosure.

FIG. 2 is a flowchart of a one-hand touch operation method according to an embodiment of the disclosure. Referring to FIG. 2, the method in this embodiment is applicable to the portable electronic device 10 in the above-described embodiment. The detailed steps of the one-hand touch operation method performed by the portable electronic device 10 are described below in conjunction with various elements in the portable electronic device 10.

In step S210, the processor 130 detects, through the touch screen 110, a touch operation for triggering a one-hand operation mode on the touch screen. Specifically, when the touch screen 110 detects a plurality of touch points generated due to the touch of a user, the processor 130 obtains information about these touch points, to further recognize, based on the information about these touch points, the touch operation performed by the user on the touch screen 110. In an embodiment, the processor 130 detects, based on information related to the touch operation such as coordinate information of the touch point at which the touch operation is formed, or a movement distance of the touch operation, that the touch operation is a drag operation, a click operation, or a touch operation of other type. Moreover, when the processor 130 detects a touch operation through the touch screen 110, the processor 130 obtains a touch start point position of the touch operation. In an embodiment, the processor 130 determines whether the touch operation matches a trigger gesture for triggering the one-hand operation mode according to information such as a position, a movement trajectory, a movement speed, and a movement direction of the touch operation. However, the type of the trigger gesture is not limited in the disclosure.

In step S220, the processor 130 defines a one-hand mode interface display region on the touch screen 110 according to a touch start point position of the touch operation. In an embodiment, when the one-hand operation mode is triggered and activated, the processor 130 defines the one-hand mode interface display region according to the touch start point position of the touch operation, to dynamically determine a size of the one-hand mode interface display region or a position of the one-hand mode interface display region on the touch screen 110. That is, in an embodiment, when the user performs the touch operation that matches the trigger gesture at different positions on the touch screen 110, the size of the one-hand mode interface display region or the position of the one-hand mode interface display region on the touch screen 110 varies accordingly.

Figure 3:
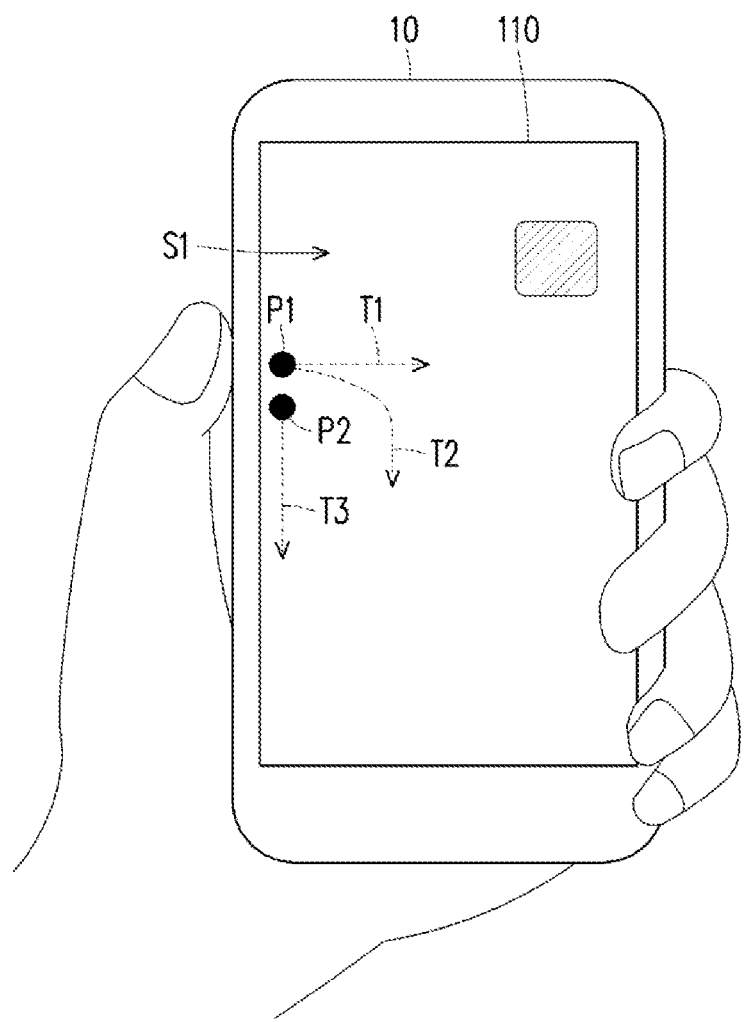
FIG. 3 is a schematic diagram of a scenario in which a portable electronic device is held with one hand according to an embodiment of the disclosure.

FIG. 3 is a schematic diagram of a scenario in which a portable electronic device is held with one hand according to an embodiment of the disclosure. Referring to FIG. 3, when a user holds the portable electronic device 10 with one hand, a thumb of the user is generally located on the touch screen 110, and the user usually uses the thumb to control the portable electronic device 10. Before the one-hand operation mode is not activated, the touch screen 110 displays an operation interface screen S1 through the full display region. Then, in some embodiments, the thumb of the user starts to move on the touch screen 110 from the left or right screen edge of the touch screen 110, to perform the touch operation that matches the trigger gesture on the touch screen 110. In an embodiment, the touch operation that matches the trigger gesture is a touch operation T1, a touch operation T2, or a touch operation T3 shown in FIG. 3. The touch operations T1 and T2 include a touch start point position P1. The touch operation T3 includes a touch start point position P2. In this case, according to the touch start point position P1 or the touch start point position P2, the processor 130 determines the size of the one-hand mode interface display region, or the position of the one-hand mode interface display region on the touch screen 110. The example in FIG. 3 is described by using an example in which the touch operation is a swipe operation, but the disclosure is not limited thereto. In other embodiments, the touch operation that matches the trigger gesture is a gesture operation of another type.

In step S230, the processor 130 displays, through the touch screen 110, an operation interface screen that is scaled down or shifted within the one-hand mode interface display region. Specifically, in an embodiment, when the one-hand mode interface display region is defined, the processor 130 shifts the operation interface screen in a specific axial direction, and controls the touch screen 110 to display the shifted operation interface screen through the one-hand mode interface display region. Further specifically, the processor 130 shifts the operation interface screen by moving a screen boundary of the operation interface screen away from a screen upper edge, so that the screen boundary of the operation interface screen that is shifted is separated from the screen upper edge of the touch screen 110. In an embodiment, when the one-hand mode interface display region is defined, the processor 130 reduces the operation interface screen according to a specific scale down factor, and controls the touch screen 110 to display an operation interface screen that is scaled down through the one-hand mode interface display region. In an embodiment, the above-mentioned scale down factor is determined according to the size of the one-hand mode interface display region. Therefore, the one-hand mode interface display region of the touch screen 110 displays the content of the operation interface screen, and the other display regions of the touch screen 110 display blank content.

Figure 4:
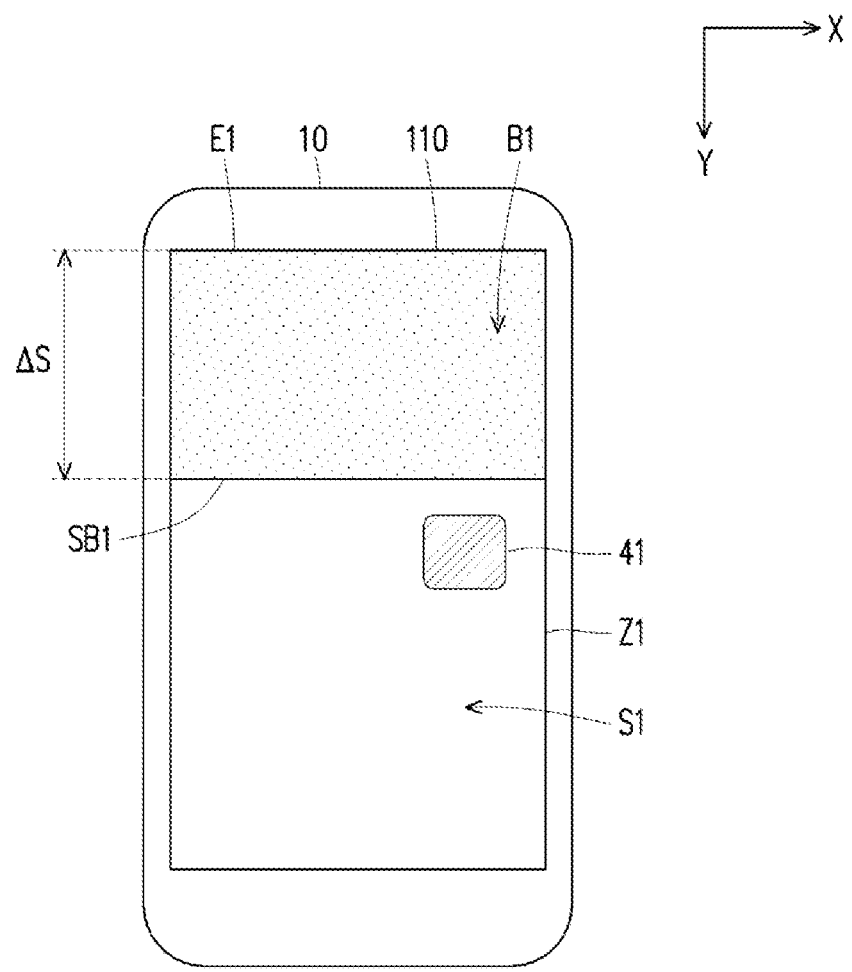
FIG. 4 is a schematic diagram of a display screen in a one-hand operation mode according to an embodiment of the disclosure.

FIG. 4 is a schematic diagram of a display screen in a one-hand operation mode according to an embodiment of the disclosure. Referring to FIG. 4, when the processor 130 defines a one-hand mode interface display region Z1 on the touch screen 110 according to the touch start point position of the touch operation, the processor 130 determines a size (a height on a Y axis in an embodiment) of the one-hand mode interface display region Z1, and the processor 130 obtains a distance ΔS (unit: pixel) between a display boundary SB1 of the one-hand mode interface display region Z1 and a screen upper edge E1 of the touch screen 110. Then, the processor 130 shifts the operation interface screen S1 downward along the Y axis of the touch screen 110 by the distance ΔS, to display the operation interface screen S1 within the one-hand mode interface display region Z1. Therefore, other display regions on an upper part of the touch screen 110 display blank content B1, and the one-hand mode interface display region Z1 of the touch screen 110 displays the upper half of the operation interface screen S1. Therefore, a user is allowed to touch an icon 41 of an application program located on an upper part of the operation interface screen S1 when holding the portable electronic device 10 with one hand.

In an embodiment, the one-hand mode interface display region is defined according to the touch start point position of the touch operation actually performed by the user. Therefore, even if a holding manner or a finger length of the user is not fixed, the processor 130 still displays the operation interface screen at a position suitable for the user to operate.

In an embodiment, the touch screen 110 determines a size of the one-hand mode interface display region such as a height and/or width of the one-hand mode interface display region according to a coordinate component of the touch start point position in a specific axial direction. In an embodiment, by table lookup according to the coordinate component of the touch start point position in the specific axial direction, the touch screen 110 directly determines the size of the one-hand mode interface display region. Alternatively, in some embodiments, a display region of the touch screen 110 includes a plurality of trigger regions side by side. The processor 130 determines whether the touch start point position is within a first trigger region among the plurality of trigger regions, to determine whether to determine the size of the one-hand mode interface display region according to the coordinate component of the touch start point position in the specific axial direction. In addition, the processor 130 determines whether the touch start point position is within a second trigger region among the plurality of trigger regions, to determine whether to directly set the size of the one-hand mode interface display region to a preset value. The embodiments are set forth below for description.

Figure 5:
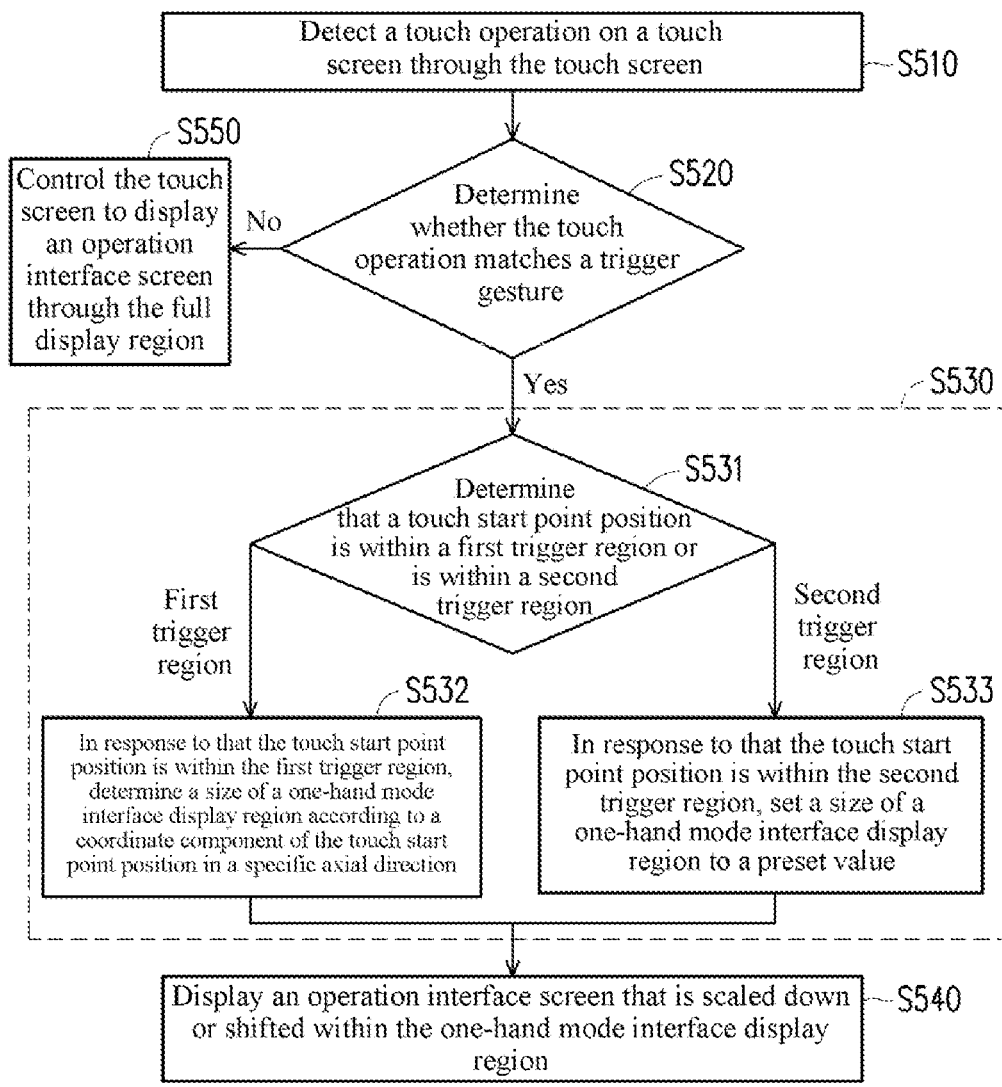
FIG. 5 is a flowchart of a one-hand touch operation method according to an embodiment of the disclosure.

FIG. 5 is a flowchart of a one-hand touch operation method according to an embodiment of the disclosure. Referring to FIG. 5, the method in this embodiment is applicable to the portable electronic device 10 in the above-described embodiment. The detailed steps of the one-hand touch operation method performed by the portable electronic device 10 are described below in conjunction with various elements of the portable electronic device 10.

In step S510, the processor 130 detects a touch operation on the touch screen through the touch screen 110. In S520, the processor 130 determines whether the touch operation matches a trigger gesture for triggering the one-hand operation mode. When it is determined in step S520 that the touch operation does not match the trigger gesture, in step S550, the one-hand operation mode is not activated, and the processor 130 controls the touch screen 110 to display the operation interface screen through the full display region.

When it is determined in step S520 that the touch operation matches the trigger gesture, in step S530, when the touch operation matches the trigger gesture, the processor 130 defines a one-hand mode interface display region on the touch screen according to a touch start point position of the touch operation. In the embodiment shown in FIG. 5, step S530 is implemented as steps S531 to S533.

In this embodiment, a display region of the touch screen 110 includes a plurality of trigger regions side by side. The arrangement, number, and size of the trigger regions are not limited in the disclosure, and are set according to actual applications. These trigger regions respectively correspond to different definition rules used for defining the one-hand mode interface display region on the touch screen 110. In other words, in an embodiment, the processor 130 uses different size definition rules according to the touch start point position to determine the size of the one-hand mode interface display region.

In step S531, the processor 130 determines that the touch start point position is within the first trigger region or is within the second trigger region. The first trigger region and the second trigger region do not overlap with each other. In this embodiment, when the touch start point position is within the first trigger region, the processor 130 determines the size of the one-hand mode interface display region according to a first size definition rule. When the touch start point position is within the second trigger region, the processor 130 determines the size of the one-hand mode interface display region according to a second size definition rule that is different from the first size definition rule.

In this embodiment, in step S532, when the touch start point position is within the first trigger region, the processor 130 determines a size of the one-hand mode interface display region according to a coordinate component of the touch start point position in a specific axial direction. In other words, when the touch start point position is within the first trigger region, the size of the one-hand mode interface display region is not a fixed preset value but a variable value.

In an embodiment, when the touch start point position is within the first trigger region, a distance between a display boundary of the one-hand mode interface display region and a screen upper edge of the touch screen 110 is equal to a distance between the touch start point position and the screen upper edge of the touch screen 110, and the screen upper edge is perpendicular to the specific axial direction. In other words, in an embodiment, when the touch start point position is within the first trigger region, the display boundary of the one-hand mode interface display region on the touch screen 110 overlaps with the touch start point position.

In an embodiment, when the touch start point position is within the first trigger region, a distance between a display boundary of the one-hand mode interface display region and a screen upper edge of the touch screen 110 is greater than a distance between the touch start point position and the screen upper edge of the touch screen 110, and the screen upper edge is perpendicular to the specific axial direction. In other words, in an embodiment, when the touch start point position is within the first trigger region, the display boundary of the one-hand mode interface display region on the touch screen 110 is located on a side of the touch start point position.

In step S533, when the touch start point position is within the second trigger region, the processor 130 sets the size of the one-hand mode interface display region to a preset value. In other words, when the touch start point position is within the second trigger region, the size of the one-hand mode interface display region is a fixed preset value.

In an embodiment, the second trigger region further includes a first edge trigger region located on one side of the first trigger region and a second edge trigger region located on the other side of the first trigger region. When the touch start point position is within the first edge trigger region, a distance between a display boundary of the one-hand mode interface display region and a screen upper edge (the screen upper edge E1 shown in FIG. 4) of the touch screen 110 is set to a minimum preset value. When the touch start point position is within the second edge trigger region, the distance between the display boundary of the one-hand mode interface display region and the screen upper edge (the screen upper edge E1 shown in FIG. 4) of the touch screen 110 is set to a maximum preset value. The above-mentioned minimum preset value is equal to a distance between one region boundary of the first trigger region and the screen upper edge (the screen upper edge E1 shown in FIG. 4) of the touch screen 110. The above-mentioned maximum preset value is equal to a distance between the other region boundary of the first trigger region and the screen upper edge (the screen upper edge E1 shown in FIG. 4) of the touch screen 110.

In step S540, the processor 130 displays an operation interface screen that is scaled down or shifted within the one-hand mode interface display region of the touch screen 110. Accordingly, the processor 130 uses different size definition rules to dynamically determine the size of the one-hand mode interface display region in the one-hand operation mode according to the touch start point position, thereby further enhancing the convenience and flexibility of the one-hand operation mode.

Hereinafter, determining the height of the one-hand mode interface display region according to the touch start point position is used as an implementation example for description, but the disclosure is not limited thereto. In other embodiments, the processor 130 determines the width or/and height of the one-hand mode interface display region according to the touch start point position.

Figure 6A:
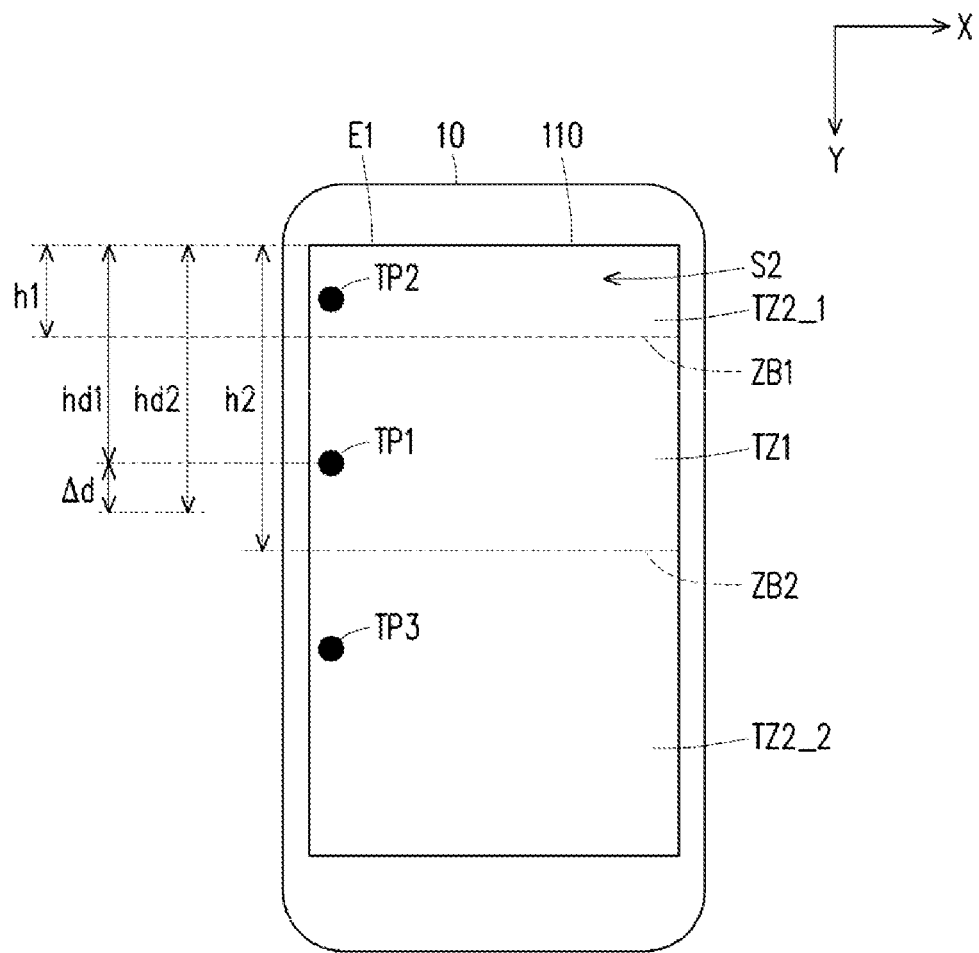
FIG. 6A is a schematic diagram of a plurality of trigger regions drawn according to an embodiment of the disclosure.

FIG. 6A is a schematic diagram of a plurality of trigger regions drawn according to an embodiment of the disclosure. FIG. 6B to FIG. 6E are schematic diagrams of shifting an operation interface screen in a one-hand operation mode drawn according to an embodiment of the disclosure.

Figure 6B:
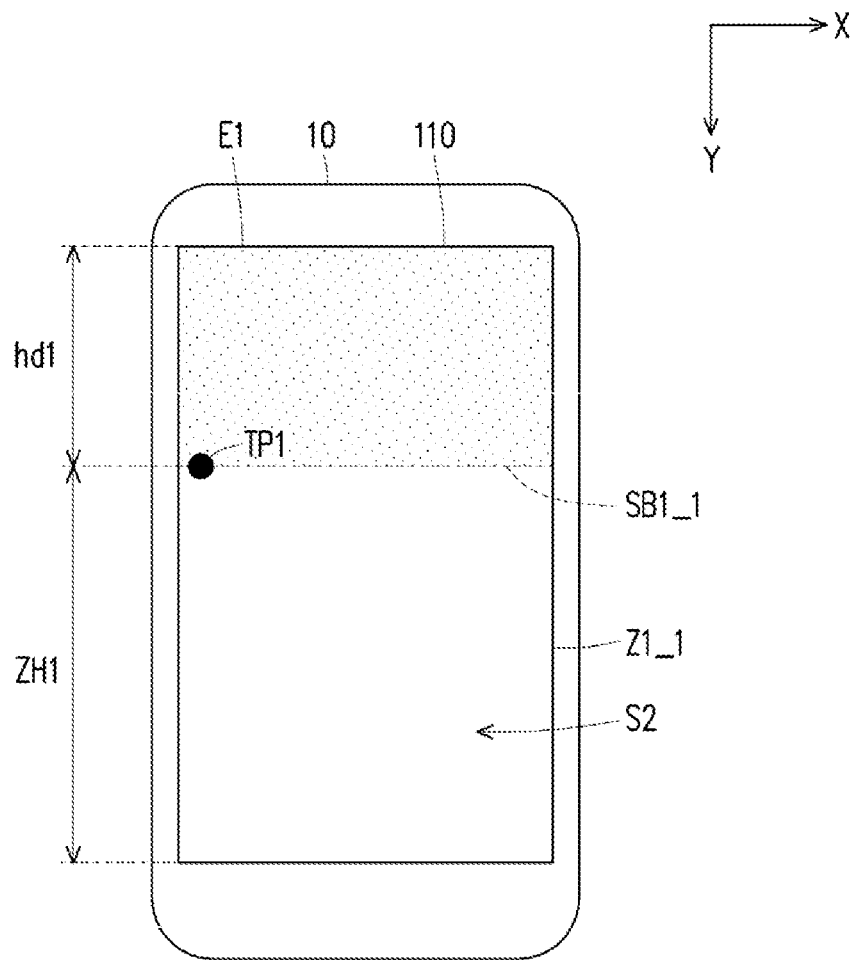
FIG. 6B to FIG. 6E are schematic diagrams of shifting an operation interface screen in a one-hand operation mode drawn according to an embodiment of the disclosure.

Referring to FIG. 6A and FIG. 6B, a display region of the touch screen 110 includes a plurality of trigger regions TZ1, TZ2_1, and TZ2_2 side by side in a vertical direction. In this embodiment, a touch start point position TP1 is located within the trigger region TZ1 (that is, the first trigger region). Therefore, according to a coordinate component of the touch start point position TP1 on the Y axis of the touch screen 110, the processor 130 defines a one-hand mode interface display region Z1_1, to determine a height ZH1 of the one-hand mode interface display region Z1_1 on the Y axis. In the example of FIG. 6B, the processor 130 obtains a distance hd1 according to the height ZH1 of the one-hand mode interface display region Z1_1 on the Y axis. The distance hd1 is a distance between a display boundary SB1_1 of the one-hand mode interface display region Z1_1 and the screen upper edge E1 of the touch screen 110. The distance hd1 is equal to a distance between the touch start point position TP1 and the screen upper edge E1 of the touch screen 110. Therefore, when the touch start point position TP1 is located within the trigger region TZ1, the touch screen 110 displays an operation interface screen S2 that is shifted down along the Y axis based on the distance hd1, to drive the one-hand mode interface display region Z1_1 of the touch screen 110 to display partial content of the operation interface screen S2. A coordinate position of the touch start point position TP1 on the Y axis is the same as a coordinate position of the display boundary SB1_1 of the one-hand mode interface display region Z1_1 on the Y axis.

Figure 6C:
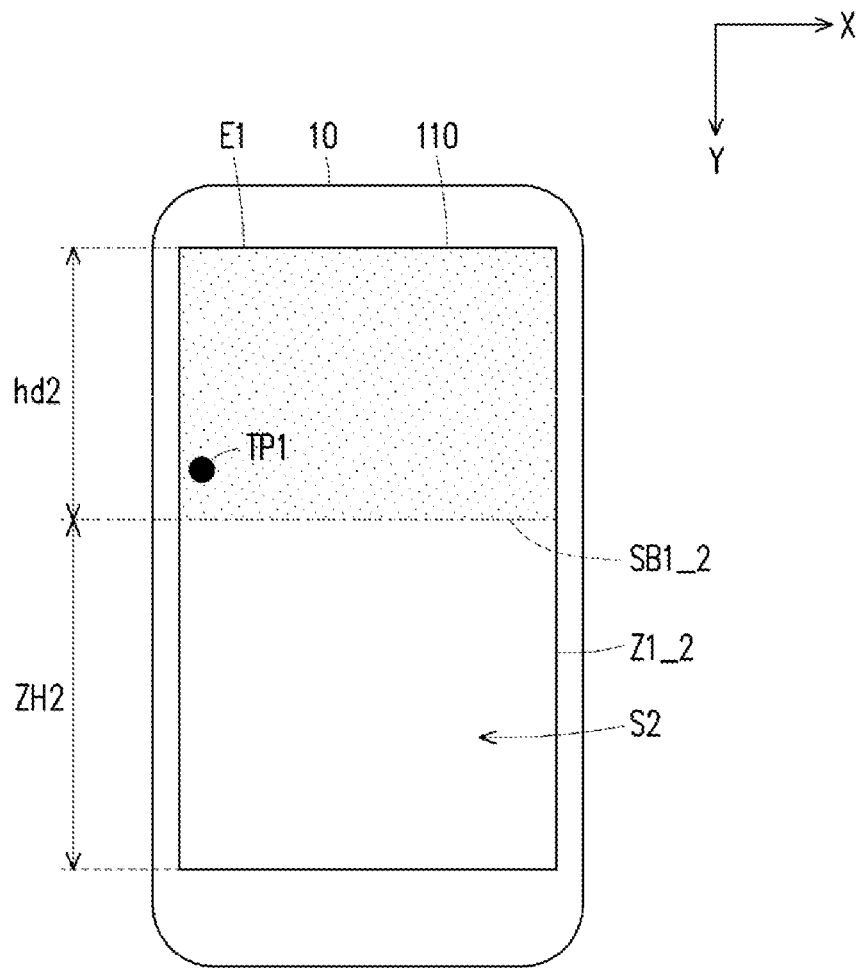

Referring to FIG. 6A and FIG. 6C, the touch start point position TP1 is located within the trigger region TZ1 (that is, the first trigger region). Therefore, according to the coordinate component of the touch start point position TP1 on the Y axis of the touch screen 110, the processor 130 defines a one-hand mode interface display region Z1_2, to determine a height ZH2 of the one-hand mode interface display region Z1_2 on the Y axis. Different from the example in FIG. 6B, the processor 130 obtains a distance hd2 according to the height ZH2 of the one-hand mode interface display region Z1_2 on the Y axis. The distance hd2 is a distance between a display boundary SB1_2 of the one-hand mode interface display region Z1_2 and the screen upper edge E1 of the touch screen 110. The distance hd2 is equal to a sum of the distance between the touch start point position TP1 and the screen upper edge E1 of the touch screen 110 and a preset difference Δd. That is, as shown in FIG. 6C, the display boundary SB1_2 of the one-hand mode interface display region is slightly lower than the touch start point position. In an embodiment, the preset difference Δd is 5 pixel units, but is not limited thereto. Therefore, when the touch start point position TP1 is located within the trigger region TZ1, the touch screen 110 displays an operation interface screen S2 that is shifted down along the Y axis based on the distance hd2, to drive the one-hand mode interface display region Z1_2 of the touch screen 110 to display partial content of the operation interface screen S2. The coordinate position of the touch start point position TP1 on the Y axis is different from a coordinate position of the display boundary SB1_2 of the one-hand mode interface display region Z1_2 on the Y axis.

Figure 6D:
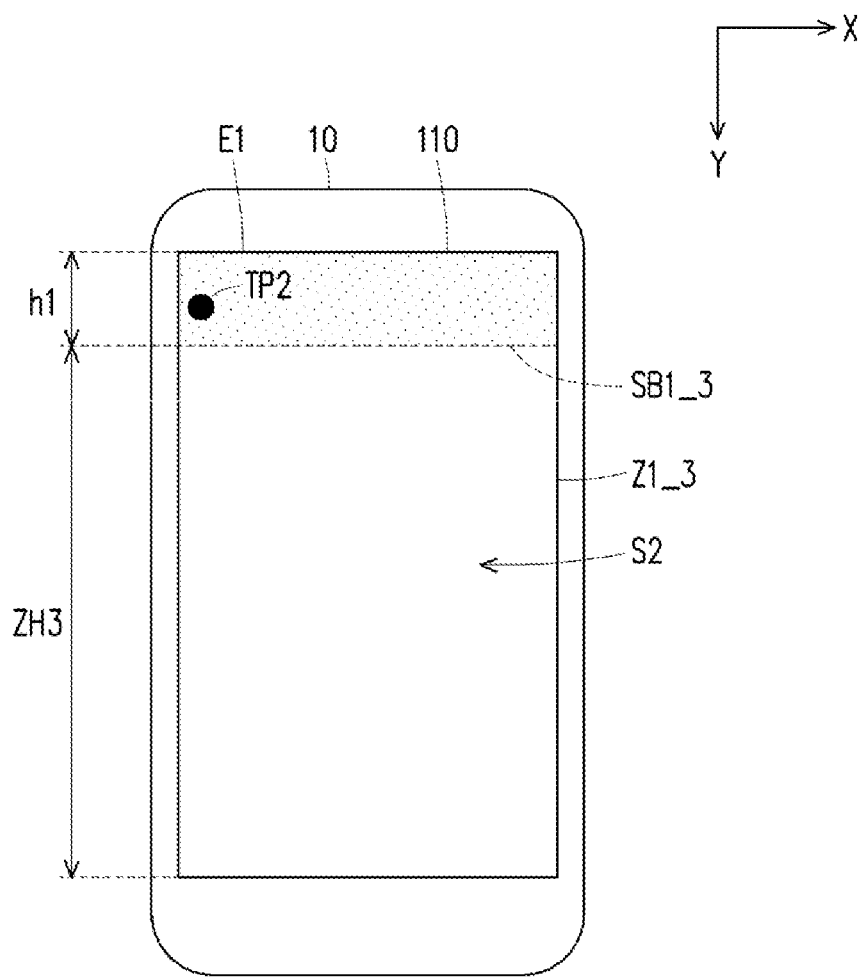

Referring to FIG. 6A and FIG. 6D, the trigger region TZ2_1 is the first edge trigger region located on an upper side of the trigger region TZ1. A touch start point position TP2 is located within the trigger region TZ2_1. Therefore, the processor 130 sets a height ZH3 of a one-hand mode interface display region Z1_3 on the Y axis to a maximum preset height, to set a distance h1 to a minimum preset value. The distance h1 is a distance between a display boundary SB1_3 of the one-hand mode interface display region Z1_3 and the screen upper edge E1 of the touch screen 110. The minimum preset value is equal to the distance h1 between one region boundary ZB1 of the trigger region TZ1 and the screen upper edge E1 of the touch screen 110. In other words, regardless of an actual position of the touch start point position TP2, the distance h1 is set to the minimum preset value as long as the touch start point position TP2 is located within the trigger region TZ2_1, so that the operation interface screen S2 is shifted down to a preset highest position on the Y axis according to the minimum preset value. The above-mentioned distance h1 is a distance between the display boundary SB1_3 of the one-hand mode interface display region Z1_3 and the screen upper edge E1 of the touch screen 110.

Figure 6E:
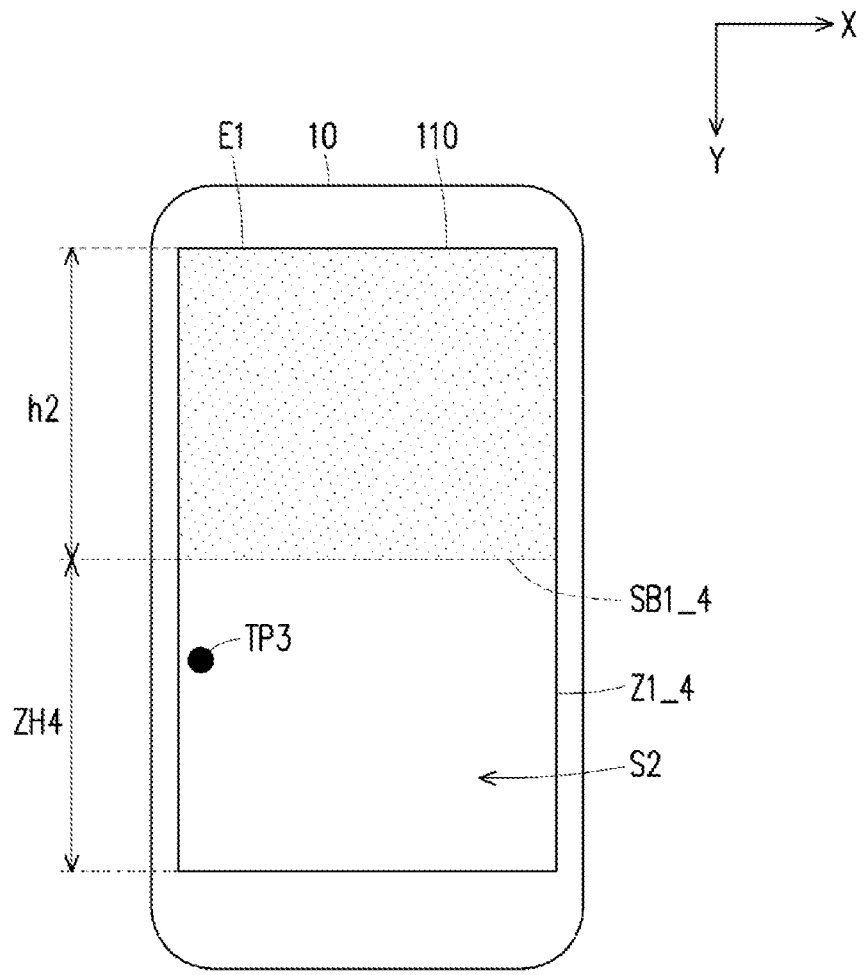

Referring to FIG. 6A and FIG. 6E, the trigger region TZ2_2 is the second edge trigger region located on a lower side of the trigger region TZ1. A touch start point position TP3 is located within the trigger region TZ2_2 on the lower side of the trigger region TZ1. Therefore, the processor 130 sets a height ZH4 of a one-hand mode interface display region Z1_4 on the Y axis to a minimum preset height, to set a distance h2 to a maximum preset value. The distance h2 is a distance between a display boundary SB1_4 of the one-hand mode interface display region Z1_4 and the screen upper edge E1 of the touch screen 110. The maximum preset value is equal to the distance h2 between the other region boundary ZB2 of the trigger region TZ1 and the screen upper edge E1 of the touch screen 110. In other words, regardless of an actual position of the touch start point position TP3, the distance h2 is set to the maximum preset value as long as the touch start point position TP3 is located within the trigger region TZ2_2, so that the operation interface screen S2 is shifted down to a preset lowest position on the Y axis according to the maximum preset value. The above-mentioned distance h2 is a distance between the display boundary SB1_4 of the one-hand mode interface display region Z1_4 and the screen upper edge E1 of the touch screen 110.

In summary, in the embodiments of the disclosure, the portable electronic device defines a one-hand mode interface display region according to a touch start point position of a touch operation performed during one-hand operation, and displays an operation interface screen that is shifted or scaled down within the one-hand mode interface display region. In this way, a situation that a user fails to control the portable electronic device with one hand due to a large touch screen is avoided. In addition, in the embodiments of the disclosure, the operation interface screen is moved to a position that actually meets the needs of the user in response to a change in a holding gesture and a finger length during one-hand operation of the user. Therefore, the convenience and flexibility of using a one-hand operation mode to operate the portable electronic device by a user are greatly enhanced.

Although the disclosure has been described with reference to the above embodiments, the embodiments are not intended to limit the disclosure. A person of ordinary skill in the art may make variations and enhancements without departing from the spirit and scope of the disclosure. Therefore, the protection scope of the disclosure should be subject to the appended claims.

What is claimed is:

1. A portable electronic device, comprising:
a touch screen, displaying an operation interface screen;
a storage device, recording a plurality of instructions; and
a processor, coupled to the touch screen and the storage device, and configured to execute the instructions to:
detect a touch operation for triggering a one-hand operation mode on the touch screen;
define a one-hand mode interface display region on the touch screen only according to a touch start point position of the touch operation; and
display an operation interface screen that is scaled down or shifted within the one-hand mode interface display region,
wherein a display region of the touch screen comprises a plurality of trigger regions side by side, these trigger regions comprise a first trigger region and a second trigger region, and the processor is configured to:
determine whether the touch start point position is within the first trigger region or the second trigger region;
determine a size of the one-hand mode interface display region according to a coordinate component of the touch start point position on a specific axis along a specific axial direction when the touch start point position is within the first trigger region, wherein a screen upper edge is perpendicular to the specific axial direction; and
set the size of the one-hand mode interface display region to a preset value when the touch start point position is within the second trigger region,
wherein the second trigger region comprises a first edge trigger region located on one side of the first trigger region and a second edge trigger region located on the other side of the first trigger region, and the processor is further configured to:
set a distance between a display boundary of the one-hand mode interface display region and a screen upper edge of the touch screen to a minimum preset value when the touch start point position is within the first edge trigger region; and
set the distance between the display boundary of the one-hand mode interface display region and the screen upper edge of the touch screen to a maximum preset value when the touch start point position is within the second edge trigger region.

2. The portable electronic device according to claim 1, wherein a distance between a display boundary of the one-hand mode interface display region and a screen upper edge of the touch screen is equal to a distance between the touch start point position and the screen upper edge of the touch screen.

3. The portable electronic device according to claim 1, wherein a distance between a display boundary of the one-hand mode interface display region and a screen upper edge of the touch screen is greater than a distance between the touch start point position and the screen upper edge of the touch screen, and the screen upper edge is perpendicular to the specific axial direction.

4. The portable electronic device according to claim 1, wherein the minimum preset value is equal to a distance between one region boundary of the first trigger region and the screen upper edge of the touch screen, and the maximum preset value is equal to a distance between the other region boundary of the first trigger region and the screen upper edge of the touch screen.

5. A one-hand touch operation method, applicable to a portable electronic device comprising a touch screen, the method comprising:
   detecting a touch operation for triggering a one-hand operation mode on the touch screen;
   defining a one-hand mode interface display region on the touch screen only according to a touch start point position of the touch operation; and
   displaying an operation interface screen that is scaled down or shifted within the one-hand mode interface display region,
   wherein a display region of the touch screen comprises a plurality of trigger regions side by side, these trigger regions comprise a first trigger region and a second trigger region, and the step of defining a one-hand mode interface display region on the touch screen according to a touch start point position of the touch operation comprises:
   determining whether the touch start point position is within the first trigger region or the second trigger region;
   determining a size of the one-hand mode interface display region according to a coordinate component of the touch start point position on a specific axis along a specific axial direction when the touch start point position is within the first trigger region wherein a screen upper edge is perpendicular to the specific axial direction;
   setting the size of the one-hand mode interface display region to a preset value when the touch start point position is within the second trigger region,
   wherein the second trigger region comprises a first edge trigger region located on one side of the first trigger region and a second edge trigger region located on the other side of the first trigger region, and the step of setting the size of the one-hand mode interface display region to a preset value when the touch start point position is within the second trigger region comprises:
   setting a distance between a display boundary of the one-hand mode interface display region and a screen upper edge of the touch screen to a minimum preset value when the touch start point position is within the first edge trigger region; and
   setting the distance between the display boundary of the one-hand mode interface display region and the screen upper edge of the touch screen to a maximum preset value when the touch start point position is within the second edge trigger region.

6. The one-hand touch operation method according to claim 5, wherein a distance between a display boundary of the one-hand mode interface display region and a screen upper edge of the touch screen is equal to a distance between the touch start point position and the screen upper edge of the touch screen.

7. The one-hand touch operation method according to claim 5, wherein a distance between a display boundary of the one-hand mode interface display region and a screen upper edge of the touch screen is greater than a distance between the touch start point position and the screen upper edge of the touch screen, and the screen upper edge is perpendicular to the specific axial direction.

8. The one-hand touch operation method according to claim 5, wherein the minimum preset value is equal to a distance between one region boundary of the first trigger region and the screen upper edge of the touch screen, and the maximum preset value is equal to a distance between the other region boundary of the first trigger region and the screen upper edge of the touch screen.

9. A portable electronic device, comprising:
   a touch screen, displaying an operation interface screen;
   a storage device, recording a plurality of instructions; and
   a processor, coupled to the touch screen and the storage device, and configured to execute the instructions to:
   detect a touch operation for triggering a one-hand operation mode on the touch screen;
   define a one-hand mode interface display region on the touch screen only according to a touch start point position of the touch operation; and
   display an operation interface screen that is scaled down or shifted within the one-hand mode interface display region,
   wherein a display region of the touch screen comprises a plurality of trigger regions side by side, these trigger regions comprise a first trigger region and a second trigger region, and the processor is configured to:
   determine whether the touch start point position is within the first trigger region or the second trigger region;
   determine a size of the one-hand mode interface display region only according to a coordinate component of the touch start point position on a specific axis along a specific axial direction by obtaining a distance between a display boundary of the one-hand mode interface display region and the screen upper edge of the touch screen when the touch start point position is within the first trigger region, wherein a screen upper edge is perpendicular to the specific axial direction, the display boundary of the one-hand mode interface display region is parallel to and adjacent to the screen upper edge of the touch screen, and the distance between the display boundary of the one-hand mode interface display region and the screen upper edge is equal to a sum of a distance between the coordinate component of the touch start point and the screen upper edge and a preset difference; and
   set the size of the one-hand mode interface display region to a preset value when the touch start point position is within the second trigger region, wherein the first trigger region and the second trigger region is arranged along the specific axial direction, and the second trigger is arranged above or below the first trigger region.

* * * * *